(12) United States Patent
Wang et al.

(10) Patent No.: US 11,513,611 B2
(45) Date of Patent: Nov. 29, 2022

(54) KEYBOARDS AND INTERFACES WITH LAYERED STABILIZERS

(71) Applicant: Apple Inc., Cupertino, CA (US)

(72) Inventors: Paul X. Wang, Cupertino, CA (US); Craig C. Leong, San Jose, CA (US); Alex J. Lehmann, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/928,319

(22) Filed: Jul. 14, 2020

(65) Prior Publication Data

US 2020/0341559 A1 Oct. 29, 2020

Related U.S. Application Data

(63) Continuation of application No. 16/545,656, filed on Aug. 20, 2019, now Pat. No. 10,747,332.

(60) Provisional application No. 62/730,971, filed on Sep. 13, 2018.

(51) Int. Cl.

| | |
|---|---|
| *G06F 3/02* | (2006.01) |
| *H01H 13/70* | (2006.01) |
| *H01H 13/14* | (2006.01) |
| *G06F 3/01* | (2006.01) |
| *G06F 3/023* | (2006.01) |

(52) U.S. Cl.
CPC .......... *G06F 3/0202* (2013.01); *G06F 3/016* (2013.01); *G06F 3/023* (2013.01); *H01H 13/14* (2013.01); *H01H 13/70* (2013.01); *H01H 2217/01* (2013.01); *H01H 2221/058* (2013.01)

(58) Field of Classification Search
CPC ....... G06F 1/1662–1684; G06F 1/3271; G06F 3/02–03; G06F 3/0426; G06F 3/04886; G06F 3/0489–04897; G06F 15/02–0291; G06F 2203/04809; G06F 1/1624
See application file for complete search history.

(56) References Cited

U.S. PATENT DOCUMENTS

| | | | | |
|---|---|---|---|---|
| 5,901,834 | A * | 5/1999 | Inubushi | H01H 13/702 |
| | | | | 200/317 |
| 6,603,408 | B1 * | 8/2003 | Gaba | H01H 13/785 |
| | | | | 200/512 |
| 6,806,815 | B1 * | 10/2004 | Kaikuranta | H01H 13/702 |
| | | | | 200/310 |
| 2003/0188960 | A1 | 10/2003 | Hsu | |
| 2004/0130528 | A1 * | 7/2004 | Baker | G06F 3/0338 |
| | | | | 345/161 |
| 2010/0109486 | A1 * | 5/2010 | Polyakov | G06F 3/044 |
| | | | | 29/25.35 |

(Continued)

*Primary Examiner* — Sanghyuk Park
(74) *Attorney, Agent, or Firm* — Dorsey & Whitney LLP

(57) ABSTRACT

An interface device includes a movable button connected to a frame structure by resilient structures positioned laterally between the button and the frame structure. Multiple layers or diaphragms of material can be used to make the button, frame, and resilient structures. Movement of the button can trigger a switch or sensor in a manner allowing an electronic device to detect interaction with the button. The interface device can be implemented in an electronic device such as a keyboard that has a low number of parts yet also providing tactile, stabilized key travel, support for various sensor or switch types for the keys, and, in some cases, haptic feedback.

18 Claims, 11 Drawing Sheets

(56) References Cited

U.S. PATENT DOCUMENTS

| | | | |
|---|---|---|---|
| 2013/0023310 A1* | 1/2013 | Jung | G06F 1/1624 455/566 |
| 2013/0199911 A1* | 8/2013 | Sato | G06F 3/0202 200/5 A |
| 2014/0266814 A1 | 9/2014 | Hu | |
| 2015/0122621 A1* | 5/2015 | Fukumoto | H01H 13/704 29/25.35 |
| 2017/0023983 A1* | 1/2017 | Lin | G06F 1/1662 |
| 2018/0074694 A1 | 3/2018 | Lehmann et al. | |
| 2019/0033923 A1* | 1/2019 | Wang | G06F 1/1637 |

* cited by examiner

KEYBOARDS AND INTERFACES WITH LAYERED STABILIZERS

CROSS-REFERENCE TO RELATED APPLICATION(S)

This is a continuation of U.S. patent application Ser. No. 16/545,656, filed 20 Aug. 2019, and entitled "FLEXIBLE STABILIZED BUTTON INPUT DEVICE," which claims priority to U.S. Provisional Patent Application No. 62/730,971, filed 13 Sep. 2018, and entitled "FLEXIBLE STABILIZED BUTTON INPUT DEVICE," the disclosures of which are hereby incorporated by reference in their entireties.

FIELD

The described embodiments relate generally to interface devices such as keys, buttons, and switches. More particularly, embodiments herein relate to keyboards using flexible layers for key stabilization.

BACKGROUND

Many electronic devices have interface devices and mechanisms to receive input and interaction from users. Major fields for device interaction include computers, such as personal computers, tablet computers, and smartphones, and other "smart" devices, such as media players, video and audio equipment, vehicle consoles, home automation controllers, and related devices. These devices can include keyboards, keypads, buttons, touchpads, and so on to receive user input. In some cases, the input devices can also provide output and feedback to users as well, such as through visual, touch/haptics, or audio indicators.

Keyboards and other interface devices are designed with buttons or keys that are pressed by users to generate input signals for a processor or controller. These devices are often designed to provide a controlled amount of resistance to the user's fingertips in order to give tactile feedback as the user presses a button or key. The feel, sound, cost, and size of each button or key are tightly controlled to efficiently provide a desired user experience. Although some keyboards are "virtual," such as software keyboards displayed on a touchscreen device, it can be beneficial to provide key travel, or movement of the keys, to help the user more easily feel, see, and hear when and where a key is pressed and to provide an overall more satisfying interaction with the device.

Providing this type of key or button can come with costs. Many interface devices have a high number of very small moving parts per button or per key, so the mechanisms are undesirably complex, expensive, and have many possible points of failure. Thus, there are many challenges and areas for improvements in interface devices.

SUMMARY

One aspect of the present disclosure relates to a keyboard having a rigid web and a set of movable buttons connected to the rigid web. Each movable button of the set of movable buttons can include a button body having a central axis, a first resilient structure connecting an outer portion of the button body to the rigid web, and a second resilient structure connecting an inner portion of the button body to the rigid web. The inner portion can be spaced inward along the central axis relative to the outer portion, and the first and second resilient structures can be spaced apart from each other along the central axis. The keyboard can also include a set of transducers to transduce application of forces to the button bodies of the set of movable buttons and a controller connection to link the set of transducers to a controller.

In some cases, the outer portion of the button body, the first resilient structure, and a first portion of the rigid web can be formed in a first layer of material. The inner portion of the button body, the second resilient structure, and a second portion of the rigid web can be formed in a second layer of material, and the outer and inner portions of the button body can be attached to each other by a joining material. The set of transducers can include a switch actuatable in response to movement of the button body relative to the first and second resilient portions, and the controller can be a keyboard controller connected to the switch and operable to output a keycode in response to actuation of the switch.

In some embodiments, the set of movable buttons can be connected to the rigid web in a grid-like pattern. The set of transducers can comprise a set of collapsible dome structures with each collapsible dome structure contacting an associated one of the set of movable buttons. In some arrangements, the button body can be compressible or can include a vibration actuator. In another embodiment, a flexible layer can cover the rigid web and the set of movable buttons.

Another aspect of the disclosure relates to an interface button that includes a frame structure, a body having a periphery and an upper end, a first resilient structure laterally connecting the periphery of the body to the frame structure, a second resilient structure laterally connecting the periphery of the interface body to the frame structure, with the second resilient structure being spaced from the first resilient structure and from the upper end, and a sensor to detect interaction of a user with the body.

In some embodiments, the interface button also includes a resilient switch, wherein the sensor is configured to detect movement of the resilient switch between an uncollapsed state of the resilient switch and an at least partially collapsed state of the resilient switch upon movement of the body. The body can also include a piezoelectric material, wherein the sensor is configured to detect a pressure applied to the piezoelectric material upon application of a force to the body.

The sensor can be a magnetic sensor configured to detect inductive current generated by movement of the body relative to the frame structure. The sensor can also include an electroactive polymer configured to change a dimension upon interaction of a user with the body.

Yet another aspect of the disclosure relates to an interface key that includes an upper layer of material having an upper central portion, an upper outer portion, and an upper resilient portion, with the upper resilient portion connecting the upper central portion and the upper outer portion. A lower layer of material can have a lower central portion, a lower outer portion, and a lower resilient portion, with the lower resilient portion connecting the lower central portion and the lower outer portion and with the lower diaphragm being spaced below the upper diaphragm. A joining material can connect the upper central portion to the lower central portion and can form a central body. A central axis can extend through the central body, and the interface key can include a transducer, wherein upon application of a force to the central body, with the force offset from the central axis, the upper and lower central portions are movable along the central axis while remaining parallel to the upper and lower outer portions. The transducer can also be configured to produce a signal in response to the application of the force to the central body.

In some configurations, the upper or lower layer of material comprises a rigid material bonded to a resilient material. The upper resilient structure or the lower resilient structure can include force apertures formed therein. The upper resilient structure or the lower resilient structure can have a thickness that is less than a thickness of the respective upper central portion or lower central portion. The upper central portion can comprise a first outward-facing surface and the upper outer portion can comprise a second outward-facing surface, with the first outward-facing surface and the second outward-facing surface being nonplanar.

The joining material can be collapsible. The upper outer portion can be positioned peripherally around the upper central portion, and the lower outer portion can be positioned peripherally around the lower central portion. The upper or lower resilient portion can comprise a first side portion and a second side portion, with the first side portion being more flexible than the second side portion.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention can be realized by reference to the following drawings. In the appended figures, similar components or features can have the same reference label.

Figure 1:
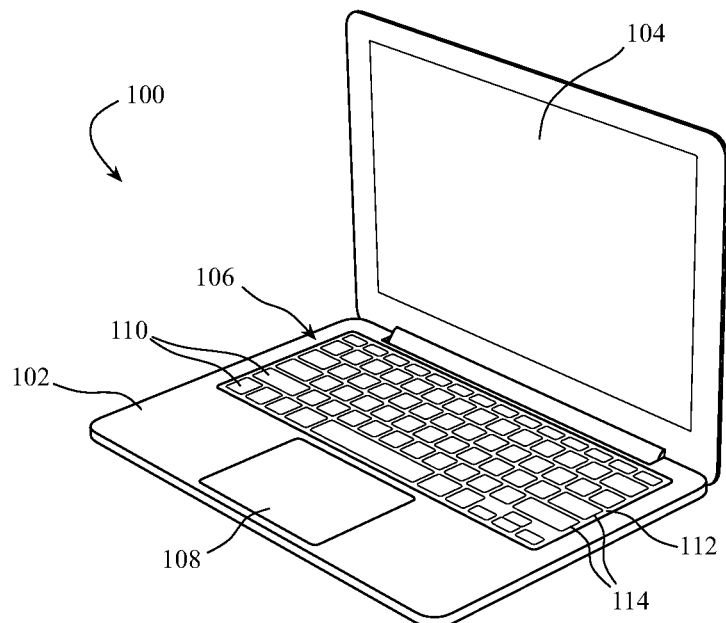
FIG. 1 is a perspective view of a computer according to an embodiment of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present description provides examples, and is not limiting of the scope, applicability, or configuration set forth in the claims. Thus, it will be understood that changes can be made in the function and arrangement of elements discussed without departing from the spirit and scope of the disclosure, and various embodiments can omit, substitute, or add other procedures or components as appropriate. For instance, methods described can be performed in an order different from that described, and various steps can be added, omitted, or combined. Also, features described with respect to some embodiments can be combined in other embodiments.

Interface devices such as computer keyboards and buttons in smartphones, tablets, and other interactive devices are often required to provide a desired amount and type of deflection, force-resistance, tactility, and noise. These factors can contribute to the user's satisfaction in using the device and their perceived quality of the device and its construction. The cost and methods used to construct and provide these interface devices can also be factors in their design and implementation.

A large number of parts can be required to produce the desired user experience for each key or button. In a keyboard key, for example, the parts can include a dome switch, a switch housing, a butterfly or scissor mechanism, a keycap, a lighting element, a substrate, and others. These parts are usually small and often delicate in order to minimize the depth of the keyboard, but they are often also required to be durable enough to endure millions of use cycles. Using a high number of parts greatly increases the cost of the device at least in part because in order to provide a consistent feel across a keyboard or set of buttons, each part is individually replicated for each key or button. For example, each key needs its own switch housing, butterfly mechanism, light diffuser, etc. In some cases, each part is individually assembled into the keyboard, thereby increasing manufacturing time, complexity, and related costs, even if it is done robotically. A keyboard with 70 keys may require over 400 delicate parts that are constructed and then precisely assembled.

Device makers often desire to implement keys or buttons that have parallel surface motion (i.e., horizontally stabilized key travel), wherein when the key is pressed, the top surface remains substantially entirely horizontal (e.g., perpendicular to the direction of travel) throughout the key's travel cycle. In other words, the top surface of the key translates in a direction perpendicular to the top surface rather than rotating during travel. This motion can be challenging to achieve, particularly when the outer edge of a key is pressed and there is a spring or flexible dome biasing the center of the key against downward translation at the same rate as the edge of the key. However, minimizing surface tilting, even when the edge of a button is pressed, can help provide consistent feel and resistance for each key press, thereby improving the overall user experience.

Aspects of the present disclosure can improve interface devices and their construction by providing lower costs in materials and manufacturing and fewer failure modes while also providing a desired amount of key travel, parallel motion, and key definition. One aspect of the present disclosure relates to an interface device having a parallel diaphragm configuration wherein two parallel layers of material are oriented horizontally (when the outward-facing surface of the button faces vertically). For example, the layers of material may be a top layer and a bottom layer. Each of the layers can have an interface portion (e.g., a central body) that is connected to surrounding portion of the respective layer (e.g., a frame or web structure) by a flexible or resilient connection surrounding the button portion or interface surface. Thus, the interface portion and its flexible connection can be referred to as a diaphragm, and because the layers of material are parallel, the device has parallel diaphragms. The interface portions can also be connected to each other so that the top interface portion and the bottom interface portion form a button or key body that moves as a single unit. In some embodiments, the body can be linked to the surrounding portions of the layers by four or more flexible connections, with an equal number of the flexible connections connecting the body to each of the layers.

When the body is pressed vertically downward or is otherwise subjected to an at least partially vertically-directed force, the top and bottom interface portions may remain substantially parallel to each other, thereby providing parallel motion and button travel. The stiffness and flexibility of the layers, connections between the layers, and the surrounding frame material can be designed to provide the desired tactility, resistance, and sound of a button press.

The interface portion, surrounding portion, and flexible connection of each layer can be formed from a single piece of material or may be constructed as a single part. This layer can also comprise multiple keys or buttons spread across its surface. Thus, the number of parts in a keyboard embodiment can be significantly (e.g., 1-2 orders of magnitude) lower than other keyboards using scissor or butterfly mechanisms to provide parallel travel. The layers can be constructed using efficient manufacturing methods, and the low number of parts can be assembled more efficiently than assembling hundreds of small parts, thereby reducing manufacturing costs. Furthermore, a parallel diaphragm button can be implemented with a variety of different types of sensors, switches, and feedback devices (e.g., haptic feedback devices), thereby making them a versatile option for many different applications and types of devices.

Additional features are now described with specific reference to the figures. FIG. 1 is a perspective view of an electronic device, in this case a notebook or laptop computer 100, including a chassis 102, a display screen 104, a keyboard 106, and a trackpad 108 (i.e., touchpad). The keyboard 106 can comprise multiple keys 110 of various sizes spread across its surface. In some embodiments, the computer 100 can also include other buttons or input elements (not shown), such as, for example, a touch screen, side buttons, an external input device (e.g., a mouse or external trackpad), mouse buttons, a trackpoint pointer nub, pointing stick, and related elements. In some embodiments, the screen 104, keyboard 106, and trackpad 108 can incorporate these other elements. For example, the screen 104 can be a touch screen, and the keyboard 106 or trackpad 108 can comprise a touch screen portion or mouse buttons. Buttons or keys can also be positioned on the back or bottom of the computer 100.

The chassis 102 can be a housing for various electronic components and parts of the screen 104, keyboard 106, and trackpad 108. The chassis 102 can comprise multiple parts assembled together into the general shape shown in FIG. 1. The chassis 102 can provide stability and protection to the computer 100. In some embodiments, the chassis 102 can provide a web 112 or frame structure for the keyboard 106 or trackpad 108. The web 112 can have a set of openings 114 with the keys 110 positioned in or through each of the openings. In some embodiments, the keys 110 are connected to the web 112 or have flexible material linking the keys 110 to the web 112 across the openings 114, as described in greater detail below.

Figure 2:
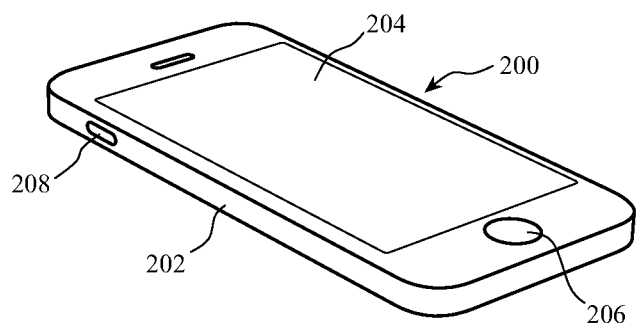
FIG. 2 is a perspective view of a smartphone/tablet computer according to an embodiment of the present disclosure.

FIG. 2 shows an electronic device, in this case a smartphone/tablet device 200, including a housing 202 or chassis, a display screen 204, and interface buttons 206, 208. The interface buttons 206, 208 can be positioned on any of the surfaces of the housing 202 accessible by a user. The interface buttons 206, 208 can be formed as part of the housing 202 or may be positioned in holes through the housing 202. In some embodiments, the buttons 206, 208 may have a different shape or size than those shown in FIG. 2.

Figure 3:
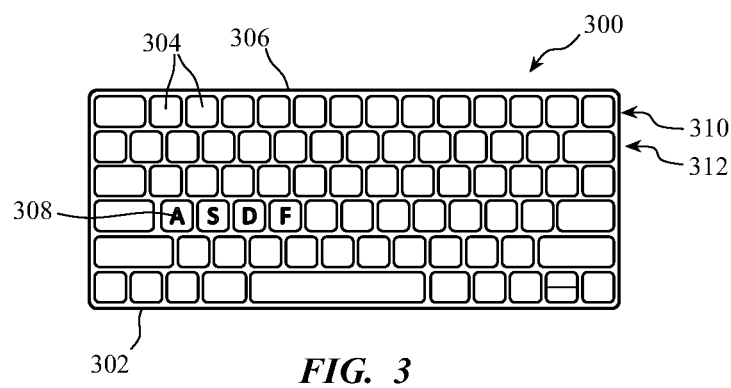
FIG. 3 is a top view of a keyboard according to an embodiment of the present disclosure.

FIG. 3 shows an input device, in this case a keyboard 300. The keyboard 300 can be the keyboard 106 used in a computer 100 such as a notebook or laptop computer, or, in some embodiments, the keyboard 300 can be a separate "external" device used with a computer such as a desktop computer or tablet computer. The keyboard 300 can include a housing 302 or chassis, a set or arrangement of keys 304, and a web 306 or frame structure in which the keys 304 are distributed. The keys 304 can each comprise a glyph 308 or legend having symbols for the typist. The keys 304 can be arranged in straight rows (e.g., rows 310, 312), straight columns, straight rows and columns combined, or in another distributed or staggered layout. In certain embodiments, the keyboard 300 can have a greater number of keys 304, or a fewer number of keys 304 than illustrated in FIG. 3. The keys 304 can be arranged in multiple different layouts. For example, the keys 304 may be arranged in an ANSI (American National Standards Institute) layout, AZERTY layout, ISO (International Organization for Standardization) layout, Dvorak layout, Colemak layout, or other related configuration. The keys 304 can have a compact layout (such as the compact layout of FIG. 3), a tenkeyless layout, 60% layout, 65% layout, 75% layout, full-size layout, or other configuration as needed to meet desired space, cost, and ergonomic considerations. As illustrated, the one or more keys 304 may be of different sizes and may be positioned at different locations along the surface of the keyboard 300.

Although a notebook computer 100, smartphone/tablet 200, and keyboard 300 are shown in FIGS. 1-3, it will be readily apparent to those having skill in the art that features and aspects of the present disclosure that are described in connection with the notebook computer 100, smartphone/tablet 200, and keyboard 300 can be applied in various other devices. These other devices can include, but are not limited to, personal computers (including, for example, computer "towers," "all-in-one" computers, computer workstations, and related devices) and related accessories, speakers, graphics tablets and graphical input pens/styluses, watches, headsets, other wearable devices, and related accessories, vehicles and related accessories, network equipment, servers, screens, displays, and monitors, photography and videography equipment and related accessories, printers, scanners, media player devices and related accessories, remotes, headphones, earphones, device chargers, computer mice, trackballs, and touchpads, point-of-sale equipment, cases, mounts, and stands for electronic devices, controllers for games, remote control (RC) vehicles/drones, augmented reality (AR) devices, virtual reality (VR) devices, home automation equipment, and any other electronic device that uses, sends, or receives human input. Thus, the present disclosure provides illustrative and non-limiting examples of the kinds of devices that can implement and apply aspects of the present disclosure.

Figure 4:
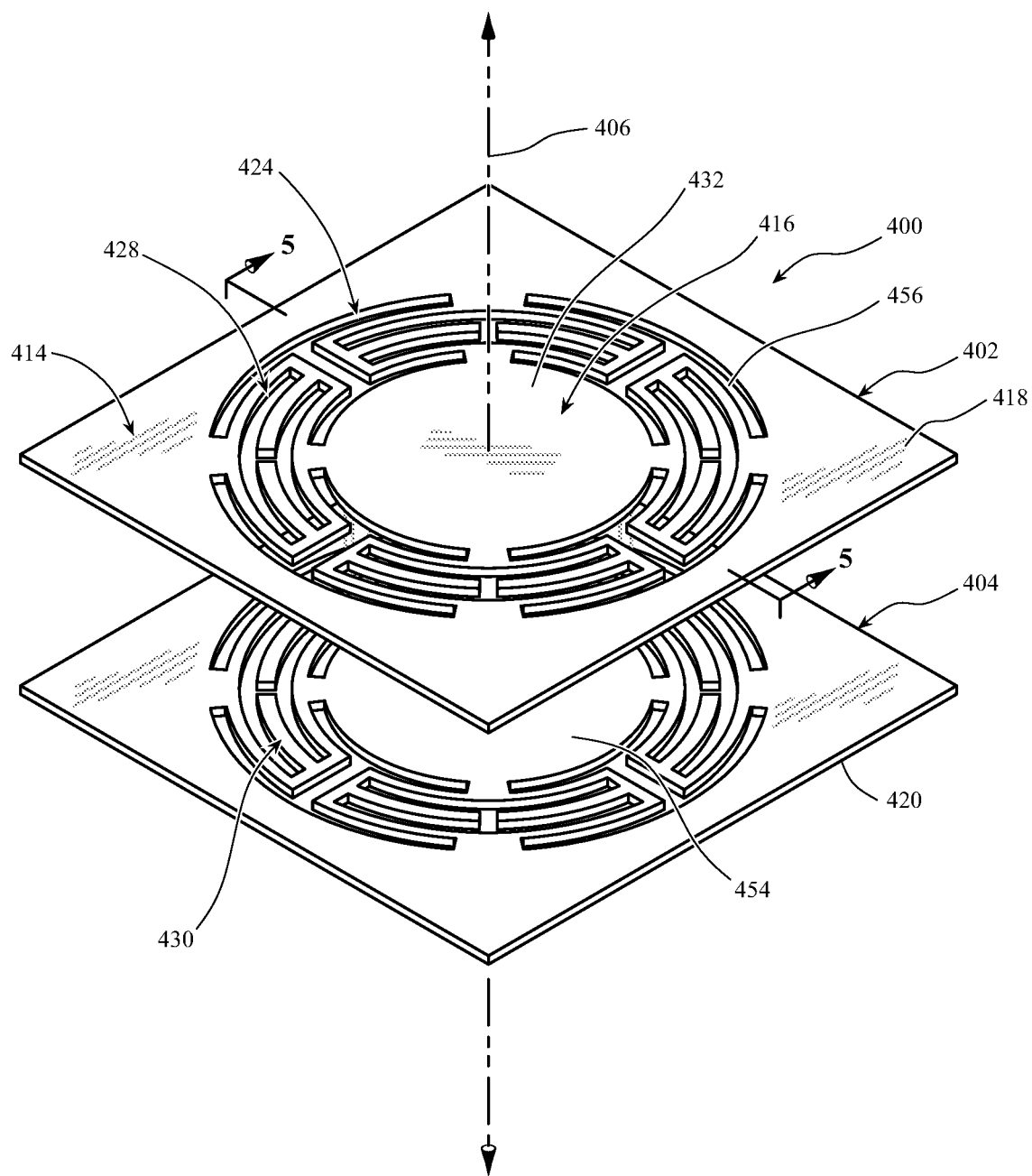
FIG. 4 is a perspective view of a flexible stabilized interface according to an embodiment of the present disclosure.
Figure 5:
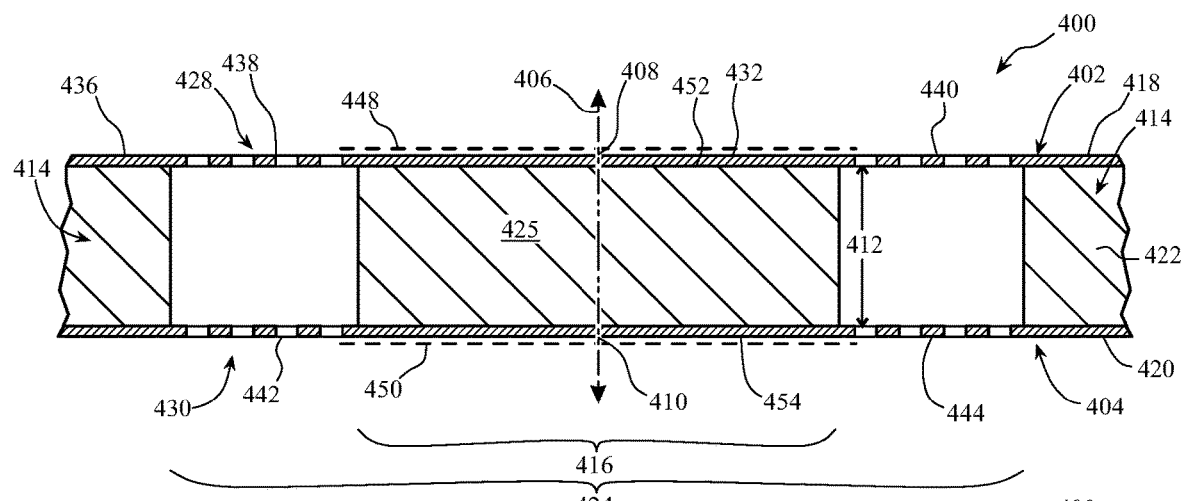
FIG. 5 is a side section view taken through section line 5-5 in FIG. 4 of a flexible stabilized interface in an unactuated state according to an embodiment of the present disclosure.
Figure 6:
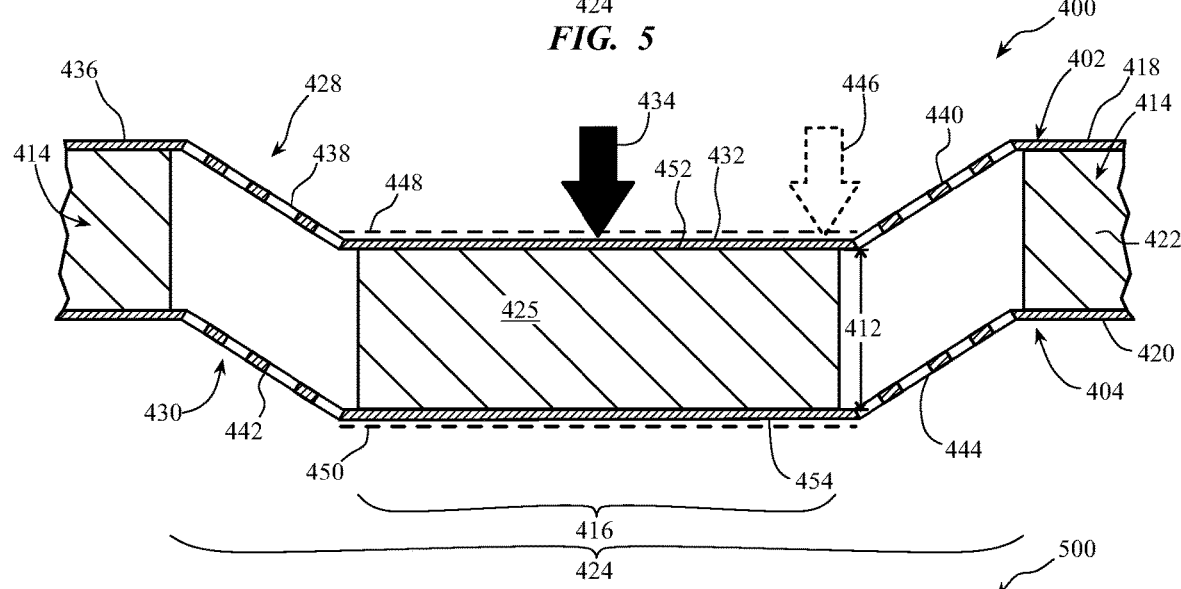
FIG. 6 is a side section view of a flexible stabilized interface in an actuated state according to an embodiment of the present disclosure.
Figure 7:
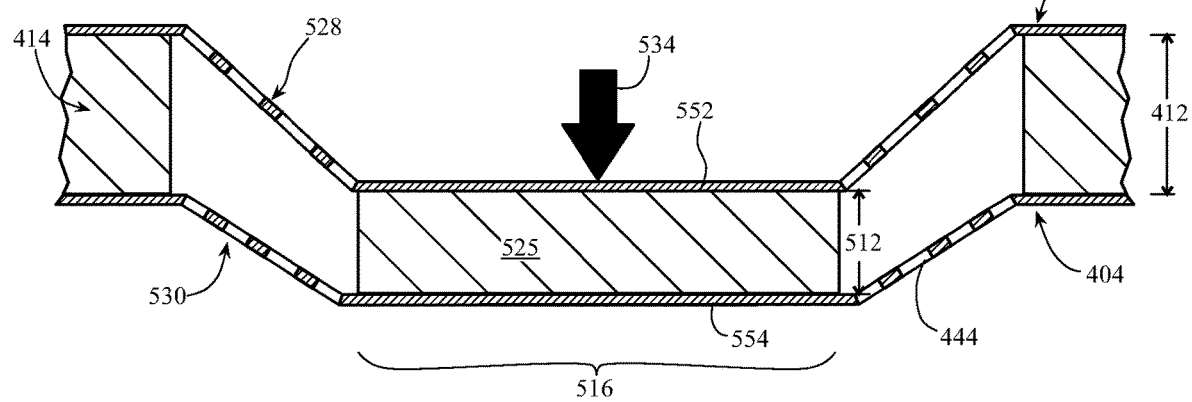
FIG. 7 is a side section view of a flexible stabilized interface in another actuated state according to an embodiment of the present disclosure.

FIGS. 4-6 illustrate a portion of a parallel diaphragm interface device 400 that can be used to implement aspects of the present disclosure. FIG. 4 shows a partial perspective view, FIG. 5 shows a diagrammatic side section view of a first configuration of the device 400, as indicated by section line 5-5 in FIG. 4, and FIG. 6 shows a diagrammatic side section view of a second configuration of the device 400. As shown in these figures, the interface device 400 can comprise a first layer 402 of material and a second layer 404 of material. The first layer 402 can be positioned at a first axial position 408 (on axis 406), and the second layer 404 can be positioned at a second axial position 410 (on axis 406). Thus, the first and second layers 402, 404 can be axially spaced apart. In other words, the layers can be positioned spaced apart relative to each other at different positions on a common central axis 406. The space between the layers can be referred to as a layer distance 412 or layer separation distance. See FIGS. 5-6. The section views shown in FIGS. 5-7 are not shown to scale and omit some parts or elements to facilitate explanation of their features.

In some embodiments, the interface device 400 can have vertically interconnected structures. For example, as shown in FIGS. 5-6, interface device 400 can have a frame structure 414 that peripherally surrounds or is otherwise positioned radially external to a central body 416 (wherein the radial direction extends outward relative to the central axis 406). In some embodiments, the frame structure 414 can comprise spaced, vertically-corresponding portions of each of the first and second layers 402, 404 such as a rigid structure 418 of the first layer 402 and a rigid structure 420 of the second layer 404. See FIG. 4. The rigid structures 418, 420 can be attached to each other by a linking structure 422 which can also be rigid. The linking structure 422 is not shown in FIG. 4 for clarity.

The frame structure 414 can comprise an interaction region 424 in which the central body 416 is positioned, as shown in FIG. 4. Thus, the central body 416 can be a generally circular shaped structure positioned in the interaction region 424. The rigid structures 418, 420 of the frame structure 414 can have a greater thickness than the interaction region 424, thereby forming a generally circular aperture in which the central body 416 is positioned. In some embodiments, the interaction region 424 and central body 416 have a circular shape, a square shape, a rectangular shape, a triangular shape, a parallelogram shape, a trapezoidal shape, an elliptical shape, a hexagonal, octagonal, or other n-gonal shape, another related shape, an irregular shape, or a combination of these shapes. See, e.g., the embodiments of FIGS. 13-18. The interaction region 424 and central body 416 can correspond in shape, such as by having the same general shape, with the central body 416 being smaller in size or proportion than the interaction region 424 as a whole.

The central body 416 can comprise portions (e.g., portions 452, 454) of the first and second layers 402, 404 that are coupled to each other. They can be coupled by a linking structure 425 that can be rigid or flexible/compressible. See FIG. 5. The linking structure 425 can be configured to ensure that the first and second layers 402, 404 remain parallel to and spaced apart from each other on each side of the linking structure 425. The linking structures 422, 425 can also be configured as light dispersing or reflecting elements (e.g., a light guide) configured to distribute light shining into a side or bottom surface of the linking structure 425 across the underside of at least the first layer 402. Thus, in some cases, the linking structure 425 can comprise a light source such as a light-emitting diode (LED) or related device, and the material used in the linking structure 425 can include a light-dispersing or light-distributing material that spreads or otherwise redirects light from the light source through the linking structure 425 and out of the central body 416 in a manner visible by a user. The light from the linking structure 425 can illuminate a glyph or other figure on the central body 416 or on a keycap or other structure attached thereto. The linking structures 422, 425 can be referred to as a joining material.

In some embodiments, the linking structures 422, 425 can include electronic and sensor components. For example, in a notebook computer, the linking structures 422, 425 can contain energy source or logic board components for the computer. The energy source can be a battery component, and the logic board component can include circuitry, electronic storage media, fans, cables, vents, wiring, related components, and combinations thereof. Similarly, wiring or other conductive channels for the switches of the keyboard can be routed through the linking structures 422, 425.

The frame structure 414 can be connected to the central body 416 about the periphery or perimeter of the interaction region 424 by a first resilient structure 428 and a second resilient structure 430. The first resilient structure 428 can link the frame structure 414 to the central body 416 at the first layer 402 of material, and the second resilient structure 430 can link the frame structure 414 to the central body 416 at the second layer 404, as shown in FIGS. 5-6. The first resilient structure 428 can laterally connect the periphery of the central body 416 to the frame structure 414, and the second resilient structure 430 can laterally connect the periphery of the central body 416 to the frame structure 414 at a position below or internal to the first resilient structure 428 (wherein the internal direction is oriented downward in FIGS. 5-6 and an external direction is oriented upward).

The entire interaction region 424 of the interface device 400 can move when a vertically-downward-oriented force is applied to a top surface 432 (i.e., an interface surface) of the central body 416. For example, the interaction region 424 can change from the first configuration shown in FIG. 5 to the second configuration shown in FIG. 6 in response to application of a force 434 (See FIG. 6). The change in configuration between FIGS. 5 and 6 can be referred to as pressing the button-shaped central body 416 or flexing the resilient structures 428, 430. The configuration shown in FIG. 5 can be referred to as an unstressed or unactuated state due to the resilient structures 428, 430 being relatively unstressed in that configuration, and the configuration shown in FIG. 6 can be referred to as a depressed state or stressed state due to the resilient structures 428, 430 being relatively stressed, extended, and elastically deformed and due to the central body 416 being depressed relative to the top surface 436 of the first layer 402 along the central axis 406.

The resilient structures 428, 430 can be divided into different regions or perimeter portions. For example, in FIGS. 5-6, the resilient structure 428 can be divided into a first portion 438 and a second portion 440 located on opposite sides of the central body 416. See also FIG. 17 and its related description herein. Similarly, resilient structure 430 can be divided into oppositely-located third and fourth portions 442, 444. The portions 438, 440, 442, 444 can be referred to as being generally located in pairs on two layers or at four corners of a side cross-section of the central body 416.

Because the portions 438, 440, 442, 444 of the resilient structures 428, 430 are laterally and vertically spaced apart in this manner, the central body 416 can move between the unstressed and stressed/depressed configurations while remaining substantially aligned with (e.g., perpendicular to) the central axis 406 throughout the motion. Likewise, when a downward force is released from the central body 416, the central body 416 can move upward from the stressed/depressed configuration to the unstressed configuration while remaining aligned with the central axis 406 (i.e., without tilting) throughout the motion. In other words, the central body 416 can have its top surface 432 remain substantially orthogonal to the central axis 406 throughout its motion or the central body 416 may translate with its top surface 432 being horizontal relative to vertical axis 406 while in motion.

The top surface 432 can be flat and horizontal, as shown in FIGS. 5-7. In some arrangements, the top surface 432 can be concave to receive a user's fingertip, can be convex to provide tactile homing for a user's fingertip, or can have a texture or shape protruding from it or recessed into it. Thus, when the top surface 432 translates, its outer perimeter or periphery can translate synchronously so that the top surface 432 does not tilt (or only tilts a very small amount) relative to the central axis 406 as it translates, even if parts of the top surface 432 are not horizontally oriented.

The parallel offset layers 402, 404 can stabilize the linear movement of the central body 416 even when the downward force 434 is not aligned with the central axis 406. For example, if an off-center force 446 (See FIG. 6) is applied to the central body 416, the central body 416 has a propensity to rotate or tilt so that the side of the central body connected to portions 440 and 444 moves lower than the side connected to portions 438 and 442. However, the offset positioning of the portions 438, 440, 442, 444 limits such tilting or rotation of the central body 416. As the portions 440, 444 flex and expand or compress, the opposite portions 438, 442 resist the tilting or rotation by compressing or expanding in response. All of the portions 438, 440, 442, 444 stabilize and balance out the compression and expansion of each other in a manner that minimizes tilting or rotation while still allowing flexible vertical travel of the central body 416. Parallel planes 448, 450 associated with, and running parallel to, the outer surfaces of the central body 416 can remain parallel to or substantially parallel to, and substantially horizontal relative to, the rigid structures 418, 420 as the central body 416 moves. In this way, the layers 402, 404 can be referred to as parallel diaphragms or diaphragm portions in the interface device 400.

Figure 8:
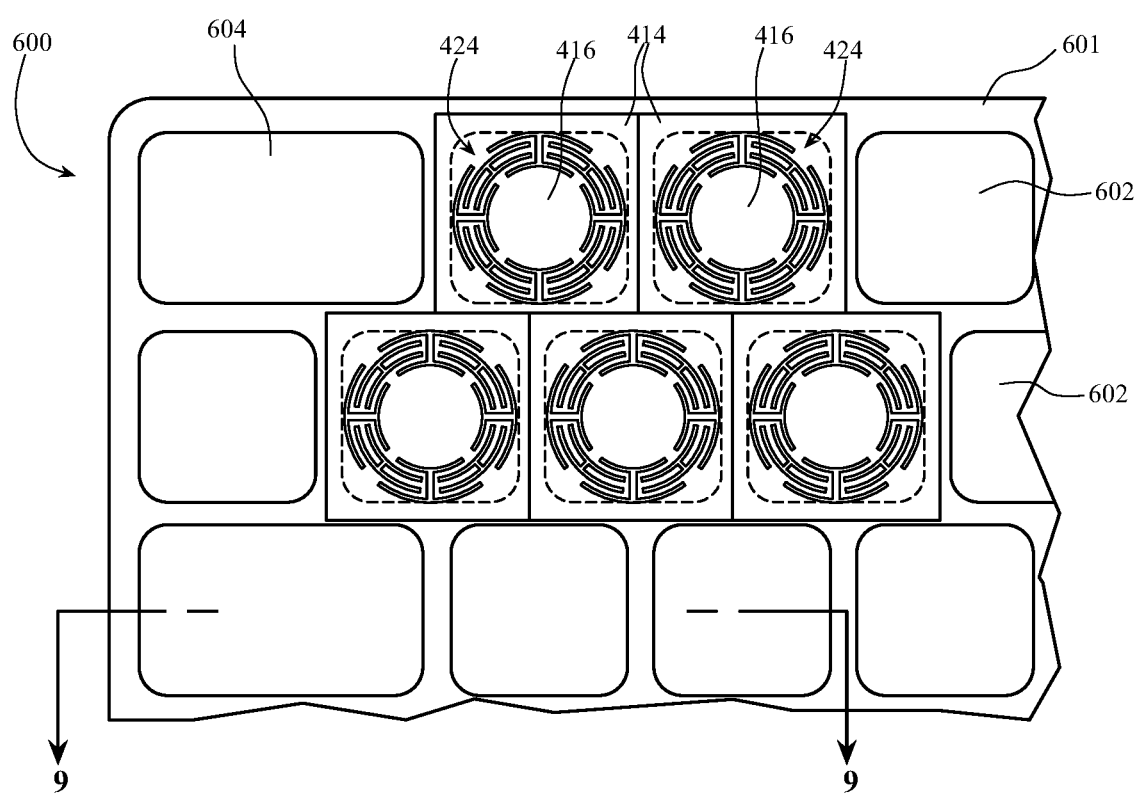
FIG. 8 is a partial top view of a keyboard according to an embodiment of the present disclosure.

In some embodiments, the frame structure 414 can be part of a device housing or chassis (e.g., chassis 102 or housing 202) or a keyboard frame or web (e.g., web 112 or web 306). The frame structure 414 can be divided into segments or blocks for each interface device 400, wherein one frame structure 414 is provided for each body 416 (e.g., as shown by the limits of the layers 402, 404 in FIG. 4). For example, the frame structure 414 for each body 416 can have a substantially square top profile with a substantially circular interaction region 424 centered within it. See FIGS. 4 and 8. In some configurations, the frame structures 414 can form a rigid network of web material that comprises multiple interaction regions 424 and movable bodies 416 therein (e.g., as shown in FIG. 8). For some embodiments, only a portion of the frame structure 414 is shown in FIG. 4, and its lateral outer limits may be connected to (e.g., bonded to or integrally connected to) other surrounding structures or other frame structure material.

Portions of the layers 402, 404 can be more flexible than others, such as the resilient structures 428, 430 being more flexible than the surrounding or adjacent material (i.e., rigid structures 418, 420 or the layer portions 452, 454 of the central body 416). In some embodiments, the surrounding material may have the same thickness and material properties as the resilient structures 428, 430, but the resilient structures 428, 430 may be made more flexible due to grooves or apertures (e.g., 456 in FIG. 4) etched (e.g., chemically etched laser etched) or cut (e.g., milled or laser cut) into or through the layers 402, 404 at the resilient structures 428, 430, wherein the localized grooves or apertures make the resilient structures 428, 430 more flexible than the surrounding material. In some embodiments, the layers 402, 404 can be thinned (e.g., by chemical/laser etching or cutting) to form the resilient structures 428, 430 relative to the surrounding material of the layers 402, 404 to increase flexibility at the resilient structures 428, 430 even though the resilient structures 428, 430 comprise the same material as the surrounding material. In other embodiments, the resilient structures 428, 430 can comprise a different material or a different proportion of composite material than the surrounding material. The resilient structures 428, 430 can also comprise a resilient wave pattern or folded material that can elastically straighten, flatten, or unfold to extend its length. See also FIGS. 13-18 and their descriptions herein.

The rigid structures 418, 420 can be connected to each other by at least one linking structure 422 and layer portions 452, 454 can be connected to each other by at least one linking structure 425. The linking structures 422, 425 can comprise material that stiffens the rigid structures 418, 420 and layer portions 452, 454 relative to the resilient structures 428, 430. Thus, in some embodiments, the layers 402, 404 comprise a flexible material that can be selectively or locally stiffened to have relatively increased rigidity where they are attached to the linking structures 422, 425.

The rigid structures 418, 420 and layer portions 452, 454 can be separated by a constant layer distance 412 across the interface device 400, as shown in FIGS. 5-6. In some embodiments, the distance between the rigid structures 418, 420 can be greater or less than the distance between layer portions 452, 454.

The layers 402, 404 can comprise a sheet of material such as sheet metal or continuously-formed polymer or composite. The layers 402, 404 can be substantially continuous in each layer (aside from any apertures formed in them). For example, the layer 402 may comprise continuously connected material running through the rigid structure 418, the portions 438, 440 of the resilient structure 428, and the outer layer 452 of the central body 416. The layers 402, 404 and linking structures 422, 425 can comprise a metal, ceramic, rigid plastic or other polymer, fiber-matrix composite, other related materials, and combinations thereof. In some embodiments, the layer portions 452, 454 can be integrally connected to or part of the linking structure 425 such that the central body 416 is a single, solid block of material. Similarly, the rigid structures 418, 420 can be integrally connected to or part of the linking structure 422.

The interface device 400 can be used as a mechanism to provide resistance and feedback to a button assembly. The resilient structures 428, 430 can resist downward forces applied to the central body 416 and therefore resist pressure applied by a finger or stylus to a button or keycap attached to the central body 416. When pressure is released, the central body 416 may elastically return to its original, unstressed position. The flexibility of the resilient structures 428, 430 and rigidity of the central body 416 and frame structure 414 may be designed and selected so that a desired amount of resistance and deflection is produced by the interface device 400 under normal operating conditions. For example, the central body 416 of the interface device 400 can have a controlled amount of vertical travel along central axis 406 wherein upon reaching a predetermined travel distance, the resistance to vertical travel provided by the resilient structures 428, 430 is greater than a predetermined threshold (e.g., a bottom-out force threshold) that in effect prevents the central body 416 from moving any further along the central axis 406 under normal usage conditions. At another predetermined travel distance, the resistance to vertical travel can form a tactile bump or peak of resistance that must be overcome to reach the bottom-out force threshold and travel distance. In some embodiments, the overall deflection (i.e., bottom-out or travel distance) of the key can be between about 0.6 millimeters to about 1.4 millimeters. The tactile bump or peak of resistance can be in a range of about 0.5 Newtons to about 0.6 Newtons, and the bottom-out force can be between about 0.7 Newtons and about 0.9 Newtons.

While reference is made herein to parts and features being "horizontal" and "vertical," it will be understood by those having ordinary skill in the art that these orientations are provided for convenience in describing features of the embodiments disclosed herein and should not be construed as limiting these embodiments to operating only in the orientations shown or described. For example, although the interface device 400 is shown as being operable in a vertical direction in FIGS. 5-6, the interface device 400 could be oriented in other ways, such as, for example, with the top surface 432 oriented vertically and with the central body 416 being movable horizontally along a horizontal central axis 406. Thus, although portions of the device are described with reference to vertical or horizontal directions, the device as a whole can be oriented at any angle.

FIG. 7 shows a side section view of an interface device 500 according to another embodiment of the present disclosure. The interface device 500 may comprise many component parts and portions in common with interface device 400, but may also comprise a linking structure 525 that is collapsible or compressible. Thus, interface device 500 may have the same shape and relative positioning of the elements of interface device 400 of FIG. 4 in an unstressed state, but when a vertically-directed force 534 is applied to the central body 516, the layer distance 512 at the central body 516 may decrease relative to the layer distance 412 of the frame structure 414.

A linking structure 525 capable of collapse or compression can be designed to collapse or compress a predetermined amount to give a "cushion" or "bump" feel to pressing against the central body 516. In some embodiments, the linking structure 525 can comprise a driver for haptic vibration of the central body 516, such as, for example, a linear resonance motor (LRM), a linear resonance actuator (LRA), a piezoelectric driver, an electromagnetic element, a solenoid, an expandable/collapsible electroactive polymer (EAP), a related vibration or other motion driver, or a combination of these devices. In some arrangements, the linking structure 525 can comprise a compressible structure such as a collapsible bi-stable dome, spring, or porous material designed to change its shape upon application of pressure by portions of the layers 402, 404. In some embodiments, the linking structure 525 can be configured to collapse in response to receiving an electrical signal. For example, if a user presses on the central body 516, a sensor can detect the movement of the central body 516 or an amount of force applied to the central body 516, thereby triggering an electronic device or circuit in the keyboard to cause an EAP element in the linking structure 525 to collapse or otherwise change shape. The change in shape of the linking structure 525 may give the user additional tactile feedback in addition to the resistance provided by the resilient structures 528, 530. The haptic feedback in the central body 516 can be provided whether or not the central body 516 is of a type of central body that changes its shape. For example, haptic feedback can be provided at the central body even if the central body is not compressible.

The interface device 500 can also comprise resilient structures 528, 530 that flex to different lengths upon compression of the central body 516. For example, as shown in FIG. 7, the outer resilient structure 528 can elongate more than the inner resilient structure 530 in a stressed condition of the interface device 500. This can be caused by the additional movement of the top layer portion 552 relative to the frame structure 414 as compared to the movement of the top layer portion 452 relative to the frame structure 414 in the embodiment shown in FIG. 6.

FIG. 8 illustrates a top view of a keyboard assembly 600 according to an embodiment of the present disclosure. The keyboard assembly 600 can comprise one or more frame structures 414 with one or more interaction regions 424 and central bodies 416. The frame structures 414 can be individually separate pieces assembled together in a keyboard frame 601 as shown in FIG. 8, or, in some embodiments, the frame structures 414 can be formed from a single integral piece of material or bonded or attached to each other in the keyboard assembly 600. The frame structures 414 can also be attached to or integrally part of the frame 601. Each of the interaction regions 424 can have a corresponding keycap 602 attached to the central bodies 416. For example, one of keycaps 602 can be attached to each of the top surfaces 432 of the central bodies 416. A user can press on a keycap 602 to move one of the central bodies 416 without their finger or stylus coming into direct contact with the central body 416, resilient structure 428, or frame structure 414. A keycap can have a shape that is generally square (e.g., the square with rounded corners of keycap 602), circular, rectangular (e.g., the rectangle with rounded corners of keycap 604), or another shape. In some embodiments, the frame structures 414 and interaction regions 424 can correspond to the shape of the keycap, such as by having a generally elliptical or rectangular interaction region 424 for an elongated keycap (e.g., 604). This can help stabilize larger keycaps (e.g., a spacebar) and ensure parallel travel of the keycap when pressed on an end thereof. In other cases, each keycap can have a frame structure 414 and interaction region 424 that is the same, and other elements can be used to stabilize the keycap.

Figure 9:
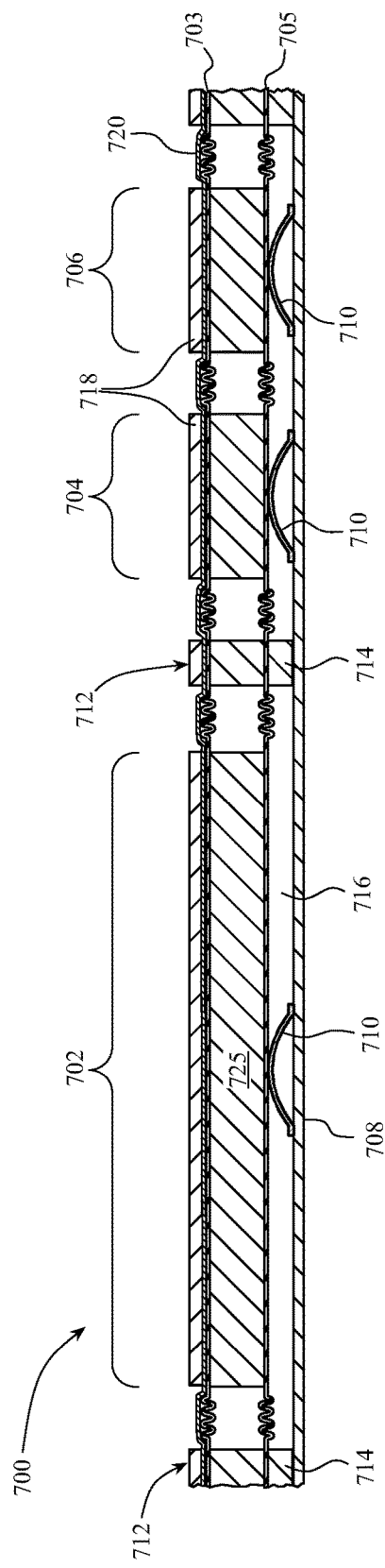
FIG. 9 is a side section view taken through section line 9-9 in FIG. 8 of a flexible stabilized interface according to an embodiment of the present disclosure.

FIG. 9 illustrates a side section view of a keyboard assembly 700 (e.g., keyboard assembly 600, as indicated by section line 9-9 in FIG. 8) using parallel diaphragm interface devices in another embodiment of the present disclosure. The keyboard assembly 700 can comprise a set of adjacently positioned key assemblies 702, 704, 706 that use elements and features of the parallel diaphragm interface devices 400 or 500. The key assemblies 702, 704, 706 can comprise a common, continuous pair of layers 703, 705. The keyboard assembly 700 can also include a base layer 708 positioned below or internal to the key assemblies 702, 704, 706. The section views shown in FIGS. 9-12 are not shown to scale and omit some parts or elements to facilitate explanation of their features.

The base layer 708 can include a substrate, base plate, printed circuit board (PCB), related components, or combinations thereof. In some embodiments, the base layer 708 can comprise one or more lights, such as light-emitting diodes (LEDs) (not shown), on its upward-facing surface that direct light upward from the base layer 708 toward the key assemblies 702, 704, 706. The LEDs can be used to illuminate the key assemblies 702, 704, 706 or at least illuminate portions of the key assemblies such as the glyphs or perimeters of the key assemblies. In some cases, the light can pass through apertures in the inner layer 705 or the inner layer 705 can comprise a light-transmissive material permitting the light to pass into the portion of the keyboard assembly 700 between the inner layer 705 and the outer layer 703. A linking structure 725 between the layers 703, 705 can also comprise a light-transmissive material that can distribute or redirect light through the linking structure 725. The outer layer 703 can also be translucent or transparent to permit light to enter, pass through, or pass around a keycap 718.

Each key assembly 702, 704, 706 can also include at least one sensor 710 or transducer. The sensors 710 of FIG. 9 are depicted as collapsible domes. In some embodiments, the sensors 710 can comprise at least one collapsible dome switch (e.g., made of flexible metal, flexible polymer, rubber, or related material), optical sensor (e.g., a photoconductive sensor, through beam sensor, retroreflective sensor, or related device), piezoelectric sensor, strain gauge, magnetic sensor, force-sensitive resistor (FSR), related device, or combinations of these elements. A sensor can also or alternatively be positioned in or otherwise comprise the linking structure 725 of each key assembly 702, 704, 706. This can be beneficial for optical sensors in particular since they can be sealed and protected within the layers 703, 705 with a gasket.

In embodiments having collapsible domes, vertical travel of a key assembly (e.g., 702) can collapse a dome, thereby triggering an electrical signal (e.g., making or causing an electrical contact at a PCB of the base layer 708) that can be used to indicate that the key assembly has been pressed or operated. In embodiments with an optical sensor, movement of a key assembly 702, 704, 706 can trigger an electrical signal to be produced by the optical sensor. For a piezoelectric sensor, pressure against a key assembly 702, 704, 706 can induce an electrical signal in the sensor. See also FIG. 11 and its related description herein. For a strain gauge or FSR, strain in a key assembly 702, 704, 706 or its resilient supports as a result of movement of the key assembly 702, 704, 706 can affect electrical properties of the sensor. A magnetic sensor can detect a change in a magnetic field induced by movement of the key assembly 702, 704, 706, such as by a coil generating eddy currents as the key assembly moves. Thus, each separate key assembly 702, 704, 706 can have its own sensor 710 that triggers a different electrical signal when each respective key assembly is operated.

At least some of the key assemblies (e.g., 702, 704) can be spaced apart from each other with frame members 712 positioned between them. The frame members 712 can be configured to be stationary relative to the base layer 708 when the key assemblies 702, 704, 706 are operated. The frame members 712 can be connected to or part of a housing or frame of the keyboard assembly 700. Frame members 712 can include supports 714 that space the inner layer 705 from the base layer 708 to ensure that there is a gap 716 between the inner layer 705 and the base layer 708 for key travel.

In some embodiments, at least some of the key assemblies (e.g., 704, 706) do not have a frame member 712 located between each other. In such a configuration, pressing one key assembly (e.g., 704) may trigger only the sensor 710 under the key pressed, and adjacent key assemblies (e.g., 706) may not trigger their sensor 710. For example, resistance provided by the dome supporting the unpressed key assembly may prevent the adjacent sensor 710 from triggering.

The key assemblies 702, 704, 706 can be connected to a keycap 718 positioned above the outer layer 703. The keycap 718 can provide tactile definition of each key assembly 702, 704, 706 so that a user can more easily home in on a key while using the keyboard assembly 700 without having to look at the keyboard assembly 700. The keycap 718 can have a legend or glyph to help identify the function of the key.

A cover layer 720 can be positioned external to and covering the outer layer 703. The cover layer 720 can comprise a flexible material such as a fabric, flexible polymer, mesh, rubber, related material, or combinations thereof. The cover layer 720 can help seal and protect the keyboard assembly 700 by limiting or preventing ingress of debris or fluids inward through the cover layer 720. The cover layer 720 can also increase the stiffness of the outer layer 703 by reinforcing the resilient portions and the key assemblies 702, 704, 706. The cover layer 720 can be disposed between the outer layer 703 and the keycaps 718 (if any) or the cover layer 720 may also cover the keycaps 718.

The sensors 710 can have domes with predominantly convex upward- or outward-facing surfaces and predominantly concave downward- or inward-facing surfaces, as shown in FIG. 9. In other embodiments, the domes may be inverted, with predominantly concave upward- or outward-facing surfaces and predominantly convex downward- or inward-facing surfaces. Thus, the base of the domes shown in FIG. 9 can be coupled to the inner layer 705 rather than the base layer 708.

Figure 10:
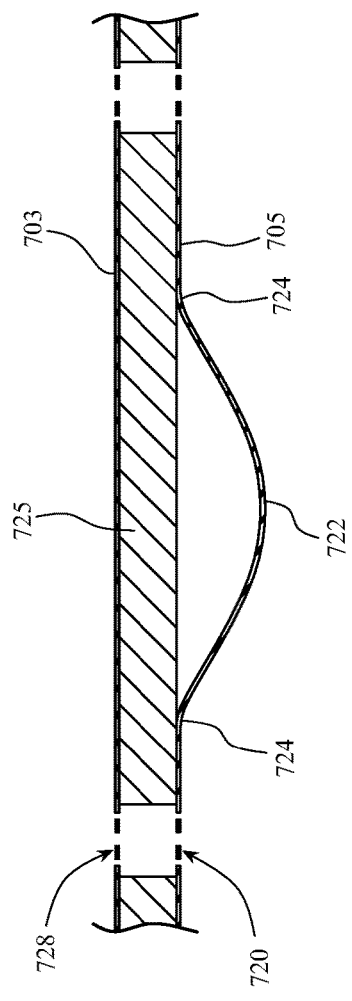
FIG. 10 is a side section view of a flexible stabilized interface according to an embodiment of the present disclosure.

In yet other embodiments, a sensor 710 can be integrated into the inner layer 705. For example, as shown in FIG. 10, an inner layer 705 can have an integrally formed dome portion 722. The integrally formed dome portion 722 can have outer limits 724 connected to the inner resilient structure 730 of the key assembly. The dome portion 722 can collapse upon downward travel of the key body and make an electrical contact or otherwise trigger a switch for sensing the key press. Portions of a sensor circuit (e.g., electrical contacts that the dome 722 touches) can therefore be located in or on the linking structure 725 between the outer and inner layers 705, 703. This configuration can beneficially reduce the number of parts in the keyboard since the domes are combined with the inner layer 703.

Figure 11:
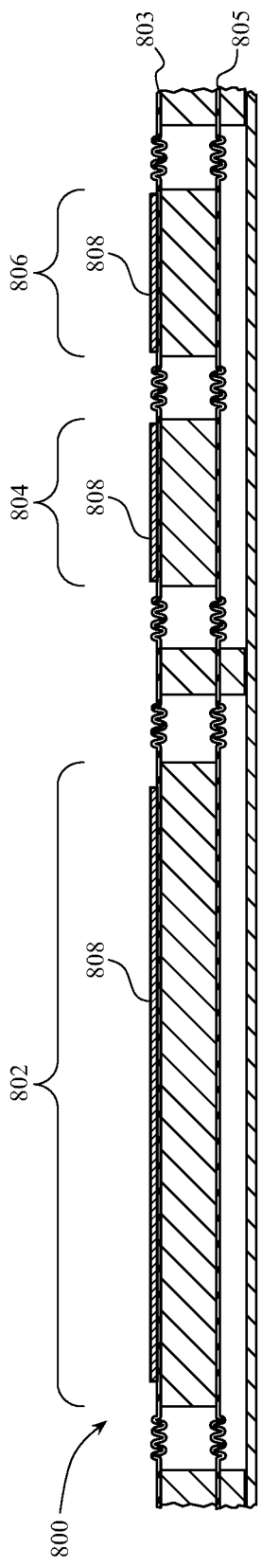
FIG. 11 is a side section view of a flexible stabilized interface according to an embodiment of the present disclosure.

FIG. 11 shows another side section view of a keyboard assembly 800 with a set of key assemblies 802, 804, 806. These key assemblies 802, 804, 806 can each comprise a piezoelectric device 808 disposed on an upper layer 803. The piezoelectric device 808 can be a touch-sensitive pad configured to output an electrical signal in response to pressure applied to the key assembly 802, 804, 806 by a user. In some embodiments, the piezoelectric device 808 can be positioned within a linking structure 825 or on a lower layer 805 of a key assembly 802, 804, 806. Thus, a dome or similar switch may not be needed to detect a key press. Additionally, the piezoelectric device 808 can be used to detect a variable amount of force applied to the key assembly 802, 804, 806. Thus, the piezoelectric device 808 can be used to generate many different signals that each depend on how much force is applied to the key assembly 802, 804, 806. Additionally, the piezoelectric device 808 can be used to detect the position on the key assembly 802, 804, 806 at which the force is applied by the user. Thus, the piezoelectric device 808 can provide a signal based on the location in which pressure is applied the piezoelectric device 808. For example, the signal generated can differ based on whether the user presses a left side of a spacebar or a right side of a spacebar.

In some arrangements, the piezoelectric devices 808 can be configured to receive a signal and vibrate at least one portion of the keyboard assembly 800 (e.g., a select key assembly or portion thereof) in response. For example, the piezoelectric devices 808 can cause resilient structures to respond to select frequencies of haptics when different frequencies of vibration are fed to the whole keyboard assembly 800 to vibrate selective key assemblies 802, 804, 806 or areas. Additionally, in some embodiments the key assemblies 802, 804, 806 can use the piezoelectric devices 808 to simulate a "buckling" or tactile sensation as the key assemblies 802, 804, 806 are pressed. For instance, at a predetermined amount of force applied or when a predetermined amount of key travel is reached, a vibration may be produced at the key assembly 802, 804, 806 that feels to the user's fingertip like the buckling of a spring, collapse of a dome, or overcoming tactile bump on a stem of a key switch. This vibration can be provided prior to (or upon) the key assembly 802, 804, 806 bottoming out against a base layer.

Figure 12:
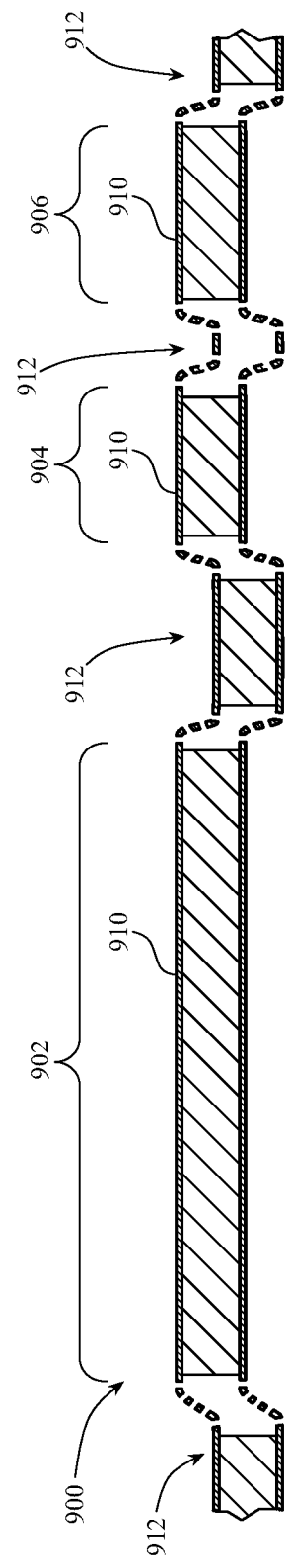
FIG. 12 is a side section view of a flexible stabilized interface according to an embodiment of the present disclosure.

FIG. 12 shows another side section view of an embodiment of a keyboard assembly 900. In this embodiment, the keyboard assembly 900 comprises key assemblies 902, 904, 906 that have raised top surfaces 910 relative to nearby frame members 912 or relative to spaces between the key assemblies 902, 904, 906. The raised top surfaces 910 can provide key definition for the user's touch. In some embodiments, the key assemblies 902, 904, 906 are formed with stamped layers of sheet material (e.g., sheet metal), wherein the key assemblies 902, 904, 906 have at least their top surfaces 910 raised in the manner shown in FIG. 12 in an unactuated state. In an actuated state, the top surfaces 910 may be pressed downward. In some embodiments, the first layer 903 and second layer 905 are both raised, as shown in FIG. 12. Alternatively, the first layer 903 can be raised, as shown in FIG. 12, and the second layer 905 can be substantially flat (or substantially co-planar, similar to layers 705 and 805) when unactuated. The top surfaces 910 can be nonplanar with the top surfaces of the frame members 912 or other surfaces adjoining outer edges of the top surfaces 910.

The resilient structures of various embodiments disclosed herein (e.g., 428, 430, 528, 530, 728, 730) can be constructed using various techniques to provide flexibility of those structures relative to portions of the interface devices that surround the structures or are positioned within the bounds of the structures. FIGS. 13-18 illustrate various configurations of resilient structures that can be implemented to provide resilient structures for any of the embodiments disclosed herein. The teachings of each of the embodiments of these figures can be implemented individually or in combination with teachings of other embodiments.

Figure 13:
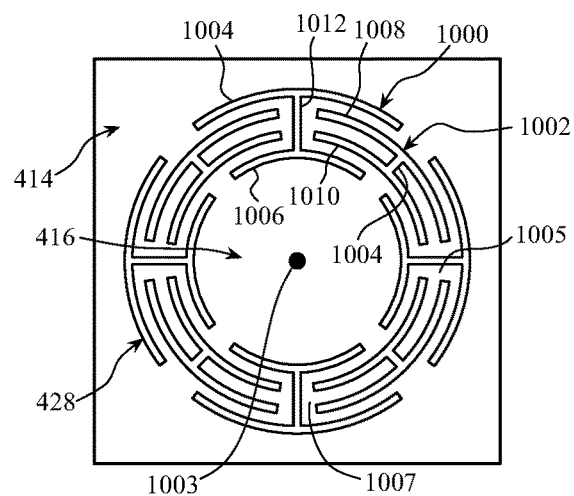
FIG. 13 is a top view of a flexible stabilized interface according to an embodiment of the present disclosure.

In FIG. 13, a resilient structure 428 is shown with several apertures (e.g., 1000, 1002). The apertures can be arranged circumferentially around a center point 1003 of a central body 416 that is connected to a frame structure 414 by thin members (e.g., 1005, 1007) that extend around the apertures. Each aperture can have at least one circumferential portion 1004, 1006, 1008, 1010 having a length extending substantially circumferentially around the center point 1003 and at least one radial portion 1012, 1014 having a length extending substantially radially relative to the center point 1003. Each aperture can have a circumferentially-arranged "H" shape that is radially and circumferentially interspersed with adjacent "H"-shaped apertures as shown in FIG. 13. The thinness of the thin members 1005, 1007 can be controlled (by also designing the size or positioning of the apertures and the thickness and material of the resilient structure 428) to make the resilient structure 428 elastically flex when the central body 416 is contacted by a user.

Figure 14:
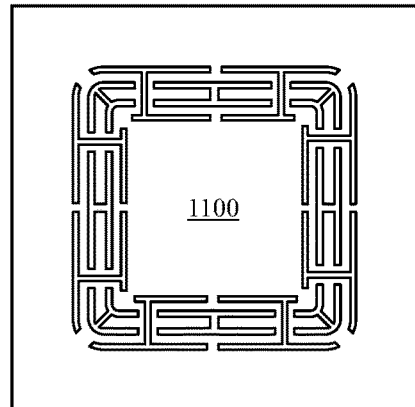
FIG. 14 is a top view of a flexible stabilized interface according to an embodiment of the present disclosure.
Figure 15:
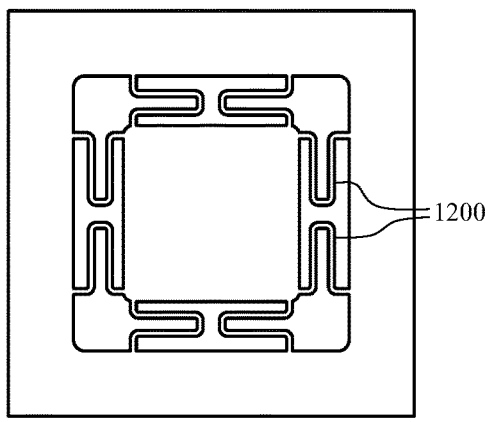
FIG. 15 is a top view of a flexible stabilized interface according to an embodiment of the present disclosure.
Figure 16:
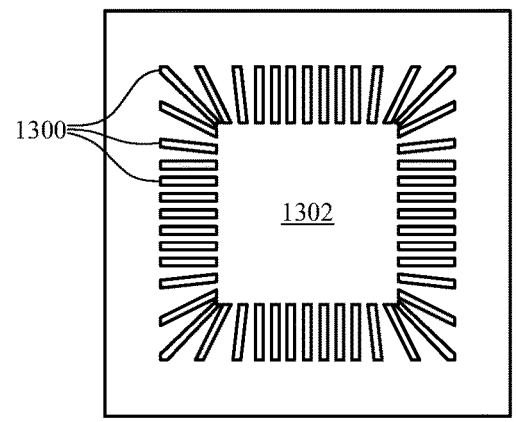
FIG. 16 is a top view of a flexible stabilized interface according to an embodiment of the present disclosure.

FIG. 14 illustrates another embodiment wherein various apertures, including "H"-shaped apertures, are arranged in a substantially square shape around the central body 1100. This arrangement can allow the device to support a different shape of keycap and may be beneficial in distributing light in a square shape or provide a different feel or response to the user as compared to embodiments employing a circular shape. FIG. 15 illustrates an embodiment wherein the thin members 1200 are substantially smaller and more spaced apart from the central body and the frame structure. Thus, the embodiment of FIG. 15 may have less resistance to being pressed. The apertures around the thin members 1200 can also allow more light to pass through the layer. FIG. 16 shows an embodiment wherein apertures 1300 are all arranged substantially orthogonal to a perimeter of the central body 1302 and that form an outer perimeter around the apertures 1300 that is substantially square. Here, the flexibility of the layer can be provided primarily by elongation of the radially-arranged segments between the apertures 1300 as the central area moves.

Figure 17:
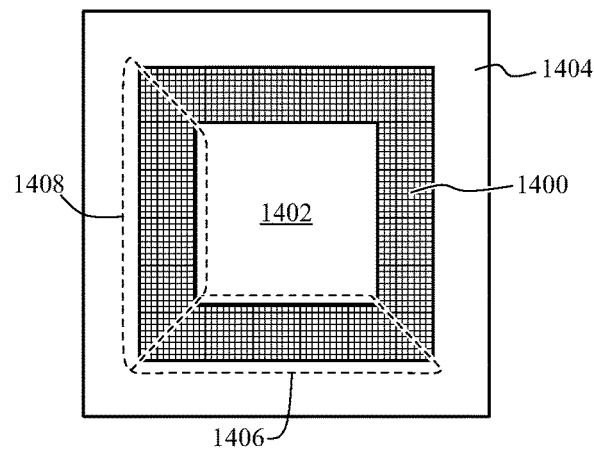
FIG. 17 is a top view of a flexible stabilized interface according to an embodiment of the present disclosure.

FIG. 17 shows an embodiment wherein the resilient structure 1400 comprises a different material or material composition than the central body 1402 and frame structure 1404. In this embodiment, the resilient structure can comprise a mesh, fabric material, silicone, or related material that stretches or flexes more easily than the material that is used in the central body 1402 and frame structure 1404. Thus, the resilient structure 1400 can be flexible without necessarily having apertures and thin members. In this embodiment, the central body 1402 and frame structure 1404 can be laminated or bonded in layers or as a stiffening matrix to the resilient structure 1400. In some arrangements, the central body 1402 and frame structure 1404 can comprise a higher concentration of resin-impregnated fibers (e.g., carbon or glass fibers or another rigid material) than the material of the resilient structure 1400.

Figure 18:
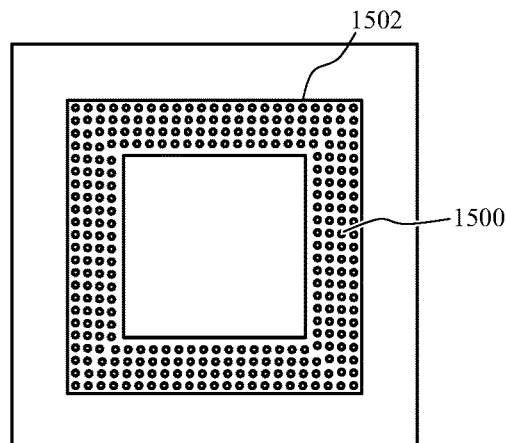
FIG. 18 is a top view of a flexible stabilized interface according to an embodiment of the present disclosure.

FIG. 18 shows another embodiment wherein the resilient structure 1500 is resilient due to a distribution of small apertures 1502 or perforations being positioned in the structure 1500. The material of the resilient structure 1500 may therefore have reduced rigidity where the apertures 1502 are formed, and the resilient structure 1500 can stretch or elastically deform more readily there as compared to material without the apertures 1502. The size of the apertures 1502 can also affect light transmission through the surface by making the brightest light in a grid pattern.

In various embodiments disclosed herein, resilient structures (e.g., 1400) can extend around a perimeter of a central body (e.g., 1402). The resilient structures can be configured to provide generally equal elastic deflection around the entire perimeter of the central body so that the top surface of the central body remains flat and parallel to the top surface of the frame structure (e.g., 1404) around the resilient structures. As used herein, a body can remain "parallel" by being completely parallel or by being substantially parallel to another line or plane of reference. Thus, a body can remain parallel to an outer portion or body if it remains completely parallel or nearly completely parallel in its motion.

However, in some embodiments, portions of the resilient structures can be configured to have a different elastic deflection along certain portions of the perimeter of a central body. For example, one side 1406 of a resilient structure can be stiffer than another side 1408 thereof. This can make the resilient structure stretch and deflect differently at different portions around the perimeter of the central body. The central body can deflect with its top surface oriented at an angle relative to the top surface of the frame structure around the resilient structure. This arrangement can allow the key switch or button to deflect at an angle in a manner more ergonomic for a user's fingertip if the fingertip presses the switch or button at a non-orthogonal angle relative to the top surface of the central body. In some embodiments, the flexibility of different portions of the resilient structures can allow the designer to make the central body more easily deflect horizontally in a direction (e.g., radially away from a central axis 406) while having a top surface that remains parallel with a top surface of the frame structure around the resilient structure.

Figure 19:
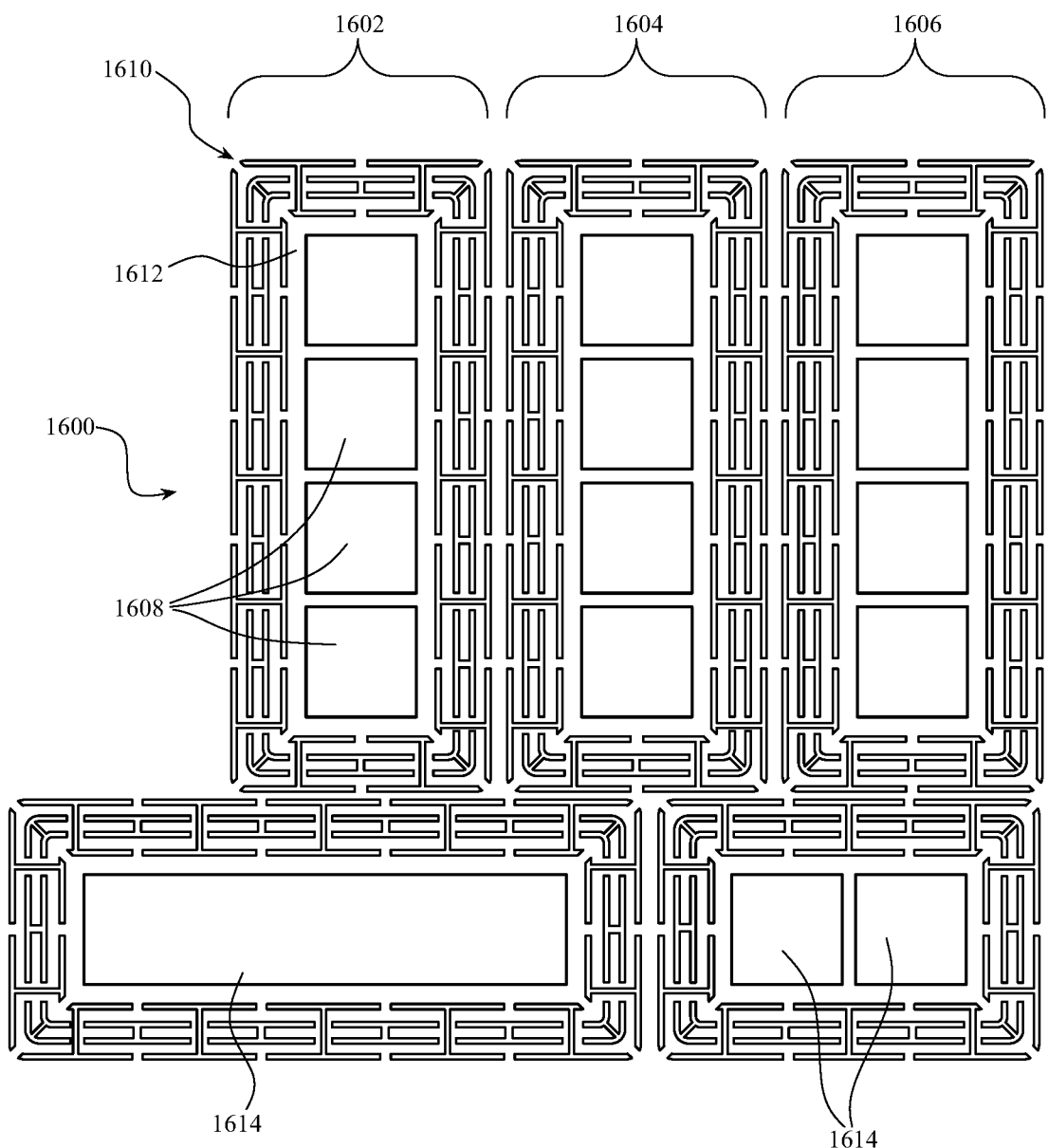
FIG. 19 a top view of a keyboard according to an embodiment of the present disclosure.

FIG. 19 illustrates another embodiment of an interface device 1600 having key assemblies 1602, 1604, 1606. Here, the key assemblies 1602, 1604, 1606 can be elongated relative to a normal single keycap shape and can comprise more than one keycap 1608 or other input location along their elongated length dimension. An entire key assembly 1602, 1604, 1606 can have at least one resilient structure 1610 extending around its periphery. The at least one resilient structure 1610 can allow the entire elongated key assembly 1602, 1604, 1606 to have stabilized, parallel travel when any of the keycaps 1608 or input locations are pressed. Thus, multiple keycaps 1608 can move in response to a key press of one of the keycaps 1608.

The interface device 1600 can also comprise a touch-sensitive element 1612 (e.g., a capacitive touch element, piezoelectric device, or related device) on at least the key assemblies 1602, 1604, 1606. The touch-sensitive element 1612 can provide a signal indicating the location on the key assembly 1602, 1604, 1606 or which keycap 1608 is pressed in the column of keycaps 1608. Thus, the key assembly 1602, 1604, 1606 can have multiple keycaps that move in response to a key press on one keycap 1608 while also providing a signal indicating which individual keycap 1608 is pressed.

The key assemblies 1602, 1604, 1606 can be arranged generally in adjacent columns. The columns may comprise keycaps 1608 for a column of keys in a keyboard, such as, for example, the "4," "R," "F," and "V" keys in a QWERTY keyboard layout or the "*," "9," "6," and "3" keys in a numpad/tenkey keyboard. Thus, each column or key assembly 1602, 1604, 1606 can correspond to the keys that a single finger would use while typing on a keyboard. By including keys in a column that would only be actuated by a single finger, the column can travel once for each key press and thereby avoid a situation wherein the column is already pressed down when a second finger attempts to press a second keycap that is on the same column. In some embodiments, a user can press on multiple keycaps 1608 on a single key assembly 1602, 1604, 1606 and thereby produce a different signal from the interface device 1600. In other configurations, the key assemblies 1602, 1604, 1606 may be elongated in rows or blocks (e.g., 2×2 or 3×3 blocks of adjacent keycaps) instead of being arranged as columns.

Configuring the key assemblies 1602, 1604, 1606 in columns can reduce the number of resilient structures 1610 needed in the input device 1600 relative to the number of resilient structures that would be needed for each individual key (e.g., as shown in FIG. 8). The keycaps 1608 of each key assembly 1602, 1604, 1606 can be arranged aligned in a column (as shown in FIG. 19) or may be laid out in a staggered pattern, grid, or other grid-like pattern such as those used in the other keyboard layouts disclosed herein or generally known in the art. The resilient structures 1610 can have boundaries defined by the perimeter shape of the staggered keycaps rather than being rectangular or square. The interface device 1600 can implement elongated key assemblies 1602, 1604, 1606 combined with other single key assemblies (e.g., 1614).

Figure 20:
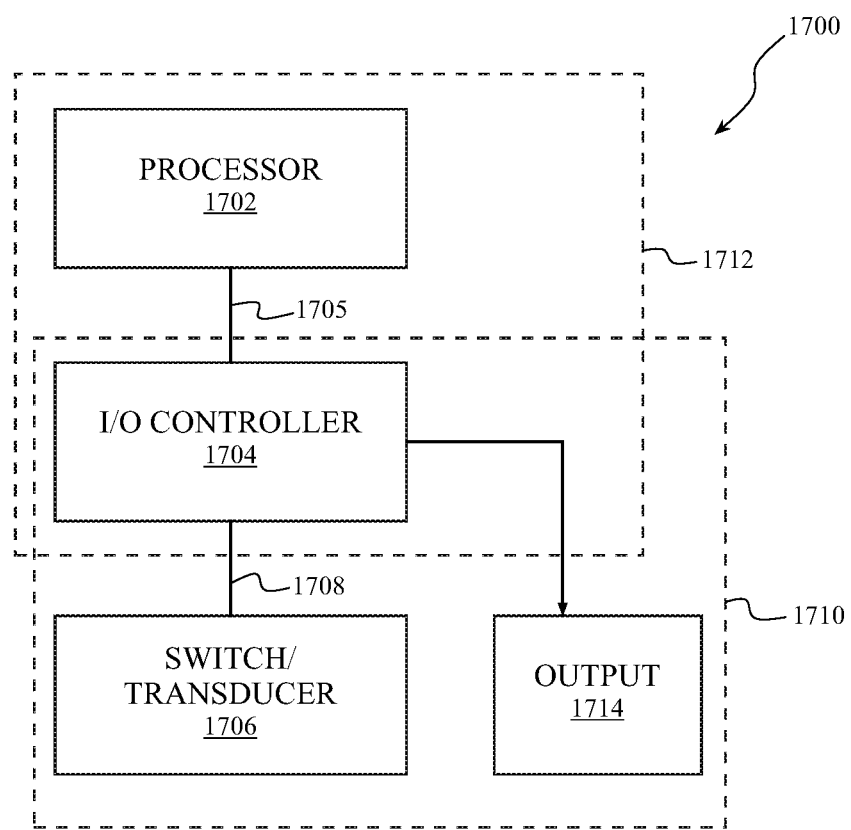
FIG. 20 is a block diagram of a system according to an embodiment of the present disclosure.

FIG. 20 is a block diagram of a system 1700 according to the present disclosure. The system 1700 can comprise a processor 1702, an input-output (I/O) controller (or keyboard controller) 1704, and a switch or transducer 1706. The system 1700 can be embodied as at least part of a computer (e.g., computer 100). These components can be connected via buses or other signal lines 1705, 1708. Other components of an electronic device may also be implemented (e.g., a power source) as needed, as will be understood by those having skill in the art.

Thus, FIG. 20 shows that an electrical connection can link the switch or transducer 1706 (which can be a sensor 710, piezoelectric device 808, or other sensor or transducer) to the I/O controller 1704. The I/O controller 1704 can be positioned in a keyboard (e.g., as indicated by box 1710) or in a separate computer housing (e.g., as indicated by box 1712 in which the processor 1702 is also included). The signal lines 1705, 1708 can be one-way or two-way lines. Thus, when a keyboard key is pressed, a transducer 1706 can provide a signal to the I/O controller 1704 which is passed to the processor 1702. In some embodiments, the signal can be a keycode for a keyboard switch or similar signal. In some configurations, the processor 1702 can send a signal to the I/O controller 1704 which is passed to the transducer 1706, such as a signal to generate a vibration or other haptic movement at the transducer 1706 (e.g., using a piezoelectric device 808 or EAP linking structure 525). In another example, the processor 1702 may send a signal via the I/O controller 1704 to an output element 1714 separate from the transducer 1706 to provide information to the user (e.g., by inducing a vibration in a central body (e.g., 416), illuminating a light on a base layer (e.g., a light-emitting diode (LED) on base layer 708), making an audible sound with a speaker, or providing another similar or related indicator as feedback).

Figure 21:
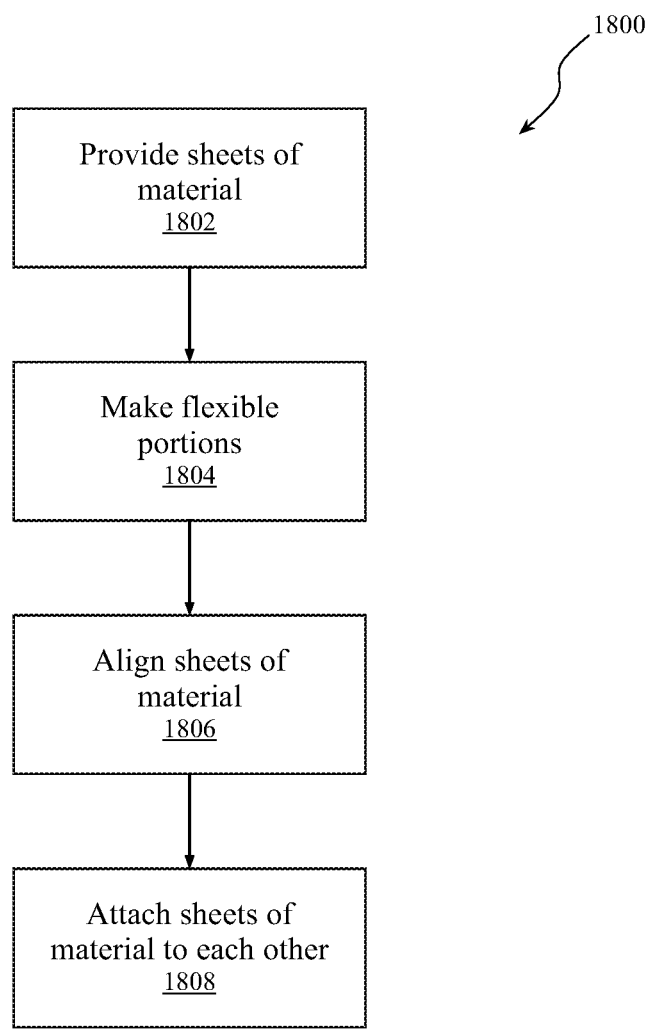
FIG. 21 is a flow diagram of a method according to an embodiment of the present disclosure.

FIG. 21 shows a flowchart illustrating a method 1800 according to an embodiment of the present disclosure. The method 1800 can include operations to construct an interface device by providing first and second sheets of material in block 1802. The first and second sheets of material can be layers of material disclosed herein (e.g., 402, 404) such as sheet metal, polymer sheets, composites, or laminates. The sheets of material can be substantially rigid or flexible.

In block 1804, the first and second sheets of material may each be made to have relatively flexible portions. For a rigid sheet of material, this can comprise reducing the rigidity of the material in a portion of the material, such as by forming voids (e.g., apertures, indentations, or grooves) in the material so that it more easily elastically deforms (e.g., flexes or bends) where the voids or other features are formed. Examples of such voids are shown in FIGS. 13-16 and 18. Voids such as those can be formed in relatively rigid or stiff material in a manner that locally increases the flexibility of the material where they are formed. The voids can be produced by cutting, etching (e.g., by laser or chemical etching), machining, molding, or performing other related processes on the sheets of material.

In another embodiment, the sheets of material can be substantially flexible, such as a sheet of fabric or other flexible interwoven material, a sheet of silicone, rubber, or related material, a sheet of thin metal, or other flexible material. Block 1804 can therefore comprise stiffening or increasing the rigidity of selective portions of the sheets of material so that desired portions of the material are flexible relative to other portions that are stiffened or more rigid than the flexible portions. The sheets of material can be stiffened by adding a reinforcing or stiffening material to the flexible material to selected parts of the flexible material. For example, as shown in FIG. 17, the interface device can comprise a composite material. A flexible material (e.g., resilient structure 1400) can be a fabric or mesh material, while the central body (e.g., 1402) and frame structure (e.g., 1404) can comprise the fabric or mesh material with an over molded rigid material, impregnated structure (e.g., resin impregnated fiber structure), etc.

In yet another embodiment, block 1804 can comprise increasing the rigidity of some portions of the material while also decreasing the rigidity of other portions thereof. Thus, combinations of the other embodiments disclosed herein can be implemented. The relatively flexible portions of the first and second sheets of material can have a similar shape and size, such as having equal maximum and minimum width dimensions across the surfaces of the first and second sheets of material.

In block 1806, a first flexible portion of the first sheet of material can be aligned with a second flexible portion of the second sheet of material. For example, as shown in FIGS. 4 and 5, the first layer 402 and second layer 404 may have their resilient structures 428, 430 vertically aligned. In some embodiments, a center axis of the first flexible portion (e.g., 406) can be axially aligned with a center axis of the second flexible portion (e.g., overlapping 406). In some arrangements, a maximum or minimum width dimension of the first flexible portion can be vertically aligned with a maximum or minimum width dimension of the second flexible portion. See, e.g., FIG. 4. Similarly, central bodies or rigid structures within the flexible portions can be axially and rotationally aligned with each other with respect to their central axes or axes along which the sheets travel on a key press.

The first and second sheets of material can be vertically spaced apart from each other and can have planar surfaces that are substantially parallel to each other. If the flexible portions comprise sections that are more flexible than others (e.g., one side of the first flexible portion of the first sheet of material is more flexible than a second side of the first flexible portion of the first sheet of material and one side of the second flexible portion of the second sheet of material is also more flexible than another side of the second flexible portion of the second sheet of material), portions of the first and second flexible portions having similar properties can be aligned. Sections of the first and second flexible portions that are more flexible can be vertically aligned, and second portions that are less flexible can be vertically aligned. Thus, each section of the flexible portions can share similar flexibility properties when aligned in block 1806.

Additionally, if there are multiple flexible portions (e.g., a multiple interaction regions 424) on the same sheet of material, block 1806 can comprise aligning the flexible portions of the first sheet with flexible portions on the second sheet of material. See, e.g., FIGS. 9, 11, and 12.

In block 1808, the first and second sheets of material can be attached to each other in a parallel and spaced apart arrangement. Attaching the first and second sheets to each other can comprise gluing, welding, adhering, bonding, or otherwise adhering the first and second sheets to each other. In some embodiments, block 1808 includes positioning or forming one or more spacers (e.g., linking structure 425, 725, etc.) between the first and second sheets and attaching the first and second sheets to each other via the spacer, which is attached (e.g., glued, welded, adhered, etc.) to each sheet. The spacer can increase the vertical thickness of the assembly and thereby help to decrease rotation of the central body during key travel. The spacer can be a rigid or a compliant structure.

The first and second sheets of material can also be arranged with at least one of the sheets of material having raised structures relative to frame structures in the assembly, such as the raised key assemblies 902, 904, 906 in FIG. 12. This can comprise molding or stamping the sheets of material to have partially raised surfaces.

The method 1800 can further include attaching a keycap (e.g., 718) to one of the sheets of material, adding a sealing layer (e.g., cover layer 720) to the assembly, adding switches or other sensors that are aligned with key or button portions defined by the sheets of material, or mounting the assembly to a keyboard frame, substrate (e.g., PCB 708), or housing (e.g., for computer 100, smartphone/tablet device 200, or keyboard 300).

In an alternative embodiment, the method 1800 can comprise providing sheets of material as described in connection with block 1802 and making portions flexible in the manner indicated in connection with block 1804. One of the sheets can then be positioned in a mold, and the spacers (e.g., linking structure 425, 725, etc.) can be insert-molded to the sheet. The sheet can have some small openings, depressions, or protrusions to provide an interlocking arrangement with the insert-molded spacers. The second plate can have an adhesive applied to it (e.g., a glue or pressure-sensitive adhesive (PSA), and the second plate can be adhered to the spacers with the flexible portions aligned. Thus, insert molding may be used as part of the assembly process. In one example embodiment, the spacer material can be insert-molded to more than one sheet at a time, such as by being insert-molded between upper and lower sheets simultaneously. Other types of joining methods can also be used to join the sheets to the spacers, such as, for example, heat staking and friction welding.

Figure 22:
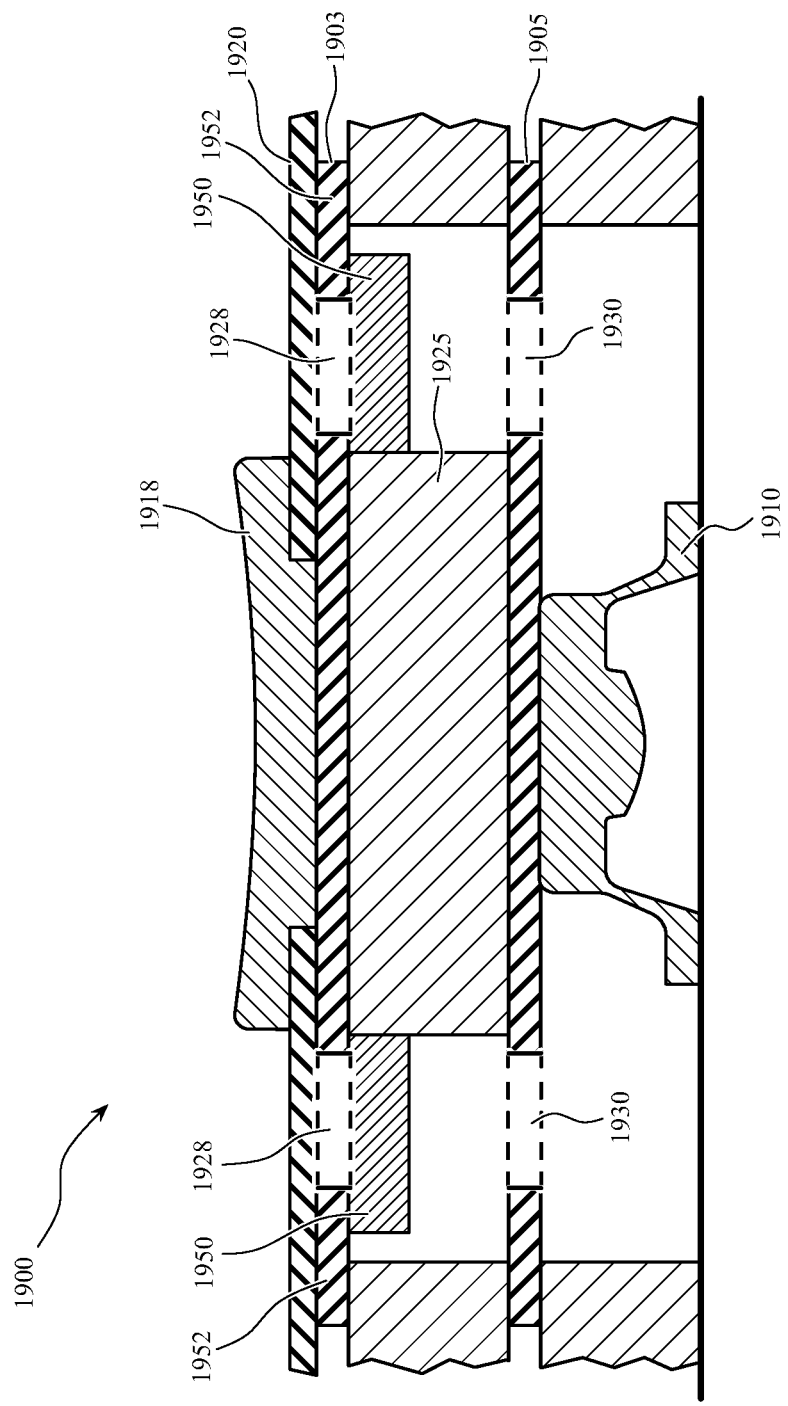
FIG. 22 is a diagrammatic section view of an embodiment of a key assembly according to the present disclosure.

FIG. 22 illustrates another alternative embodiment of a key assembly 1900 according to the present disclosure. Similar indicator numbers are used for similar parts as compared to FIG. 9. The key assembly 1900 can comprise a linking structure 1925 having at least one radially-extending protrusion (i.e., "tophat" portion) 1950 positioned between the first and second layers 1903, 1905 and between the first and second resilient structures 1928, 1930. The protrusion 1950 can have a radial dimension or a width greater than the overall width of the first resilient structure 1928 so that when the keycap 1918 is biased upward by the dome 1910, the protrusion 1950 will limit upward movement of the linking structure 1925 when it comes into contact with an outer rigid portion 1952 of the upper layer 1903. The protrusion 1950 can move with the linking structure 1925 and therefore would translate downward toward the second resilient structure 1930 when the keycap 1918 is pressed. The height of the protrusion 1950 (as viewed in the orientation shown in FIG. 22) may be tailored to limit the travel or vertical displacement of the key cap 1918 with the protrusion contacting the second layer 1905 during upon downward displacement of the key cap 1918. In other words, the travel of the key cap 1918 may be determined, at least in part, by the distance between the lower surface of the protrusion 1950 and the upper surface of the second layer 1905.

Further, the protrusion 1950 can improve the stability and appearance of the keycap 1918 when at rest and during movement of a key cycle. For example, the protrusion 1950 can reduce "seesawing" of the keycap 1918 relative to the dome 1910 when an off-center force is applied to the keycap 1918 that would otherwise cause one side of the keycap 1918 to move upward as the other side moves downward (like a seesaw) rather than compressing the dome 1910. In some embodiments, the protrusion 1950 may be integrally formed with the linking structure. In other embodiments, the protrusion may be formed as a discrete component. In further embodiments, a similar structure may be provided below the second layer, either in addition to, or in place of the protrusion 1950, to act in a similar manner in preventing see-sawing of the key cap 1918, limiting travel of the key cap 1918, or both.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed.

It will be apparent to one of ordinary skill in the art that many modifications and variations are possible in view of the above teachings.

What is claimed is:

1. A keyboard, comprising:
    a frame structure having an interaction region;
    a key body having a top surface positioned in the interaction region and movable between an unactuated position relative to the frame structure and an actuated position relative to the frame structure in response to a force applied by a finger contacting the top surface;
    a layer of material continuously extending across the interaction region, the layer of material having:
        a first surface portion positioned under the key body,
        a second surface portion positioned over the frame structure, and
        a third surface portion positioned between the first surface portion and the second surface portion, elevated relative to the first surface portion, and elevated relative to the second surface portion when the key body is in the unactuated position.

2. The keyboard of claim 1, further comprising a second layer of material positioned below the layer of material and extending across the interaction region and the key body, the second layer of material being substantially parallel to the layer of material.

3. The keyboard of claim 1, wherein the layer of material is configured to deform between the top surface and the frame structure.

4. The keyboard of claim 1, wherein the layer of material seals a gap between the frame structure and the key body against fluid ingress through the gap.

5. The keyboard of claim 1, further comprising a switch actuatable by movement of the key body between the unactuated position and the actuated position.

6. The keyboard of claim 1, further comprising a base layer attached to the frame structure, wherein the top surface of the key body is configured to move relative to the base layer between the unactuated position and the actuated position while remaining substantially parallel to the base layer.

7. An interface button, comprising:
    a frame structure;
    a button body having a periphery and an upper end, the button body being rigid;
    a sensor to detect interaction of a finger contacting the upper end of the button body;
    a resilient structure laterally connecting the periphery of the button body to the frame structure;
    wherein the resilient structure is configured to elastically deform upon movement of the button body from a first position relative to the frame structure to a second position relative to the frame structure;
    wherein the resilient structure includes a first portion positioned under the button body, a second portion positioned over the frame structure, and a third portion connecting the first portion to the second portion and positioned above the first portion and the frame structure.

8. The interface button of claim 7, wherein the sensor comprises a touch-sensitive device.

9. The interface button of claim 7, wherein the resilient structure has reduced rigidity between the frame structure and the button body.

10. The interface button of claim 7, wherein the resilient structure comprises a continuously-formed sheet of material.

11. The interface button of claim 7, wherein the resilient structure comprises a diaphragm extending from the frame structure across the button body.

12. The interface button of claim 7, wherein the resilient structure elastically stretches upon movement of the button body from the first position to the second position.

13. A keyboard interface, comprising:

a frame;

a key body movable relative to the frame, the key body having a bottom surface;

a layer of material attached to the bottom surface of the key body and to the frame, the layer of material having a substantially flat portion between the key body and the frame and positioned higher than the bottom surface and the frame when the key body is in an unactuated position, wherein the layer of material prevents ingress of fluids between the key body and the frame.

14. The keyboard interface of claim 13, wherein the layer of material prevents ingress between a second key body and the frame, wherein the layer of material is attached to the second key body.

15. The keyboard interface of claim 13, wherein the layer of material comprises a material more flexible than the key body or the frame, the material comprising a mesh, fabric, or silicone.

16. The keyboard interface of claim 13, wherein the layer of material comprises bonded layers, wherein a first portion of the layer of material is more stiffened by the bonded layers than a second portion of the layer of material.

17. The keyboard interface of claim 13, further comprising a touch sensor operable at the layer of material.

18. The keyboard interface of claim 13, wherein a portion of the layer of material between the key body and the frame is positioned between a vertical level of the bottom surface of the key body and a top surface of the key body.

* * * * *